United States Patent
Zheng

(10) Patent No.: US 8,594,713 B2
(45) Date of Patent: Nov. 26, 2013

(54) PAGING CARRIER ASSIGNMENT METHOD, MULTI-CARRIER BASE STATION AND WIRELESS COMMUNICATION DEVICE USING THE SAME

(75) Inventor: Yan-Xiu Zheng, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 385 days.

(21) Appl. No.: 12/955,885

(22) Filed: Nov. 29, 2010

(65) Prior Publication Data
US 2011/0159905 A1 Jun. 30, 2011

Related U.S. Application Data

(60) Provisional application No. 61/290,771, filed on Dec. 29, 2009.

(51) Int. Cl.
*H04W 72/00* (2009.01)
*H04W 68/00* (2009.01)
*H04B 7/00* (2006.01)

(52) U.S. Cl.
USPC ......... 455/509; 455/450; 455/452.2; 455/458

(58) Field of Classification Search
CPC ........................... H04W 68/00; H04W 76/048
USPC .................... 455/458, 426.1, 550.1
See application file for complete search history.

(56) References Cited

U.S. PATENT DOCUMENTS

| 7,437,165 | B2 | 10/2008 | Burgess et al. | |
| 8,055,281 | B2 * | 11/2011 | Kang et al. | 455/458 |
| 8,229,476 | B2 * | 7/2012 | Park et al. | 455/458 |
| 2004/0266445 | A1 | 12/2004 | Burgess et al. | |
| 2010/0271175 | A1 * | 10/2010 | Chou et al. | 340/7.25 |
| 2011/0159905 | A1 * | 6/2011 | Zheng | 455/509 |
| 2011/0292856 | A1 * | 12/2011 | Park et al. | 370/311 |
| 2012/0327856 | A1 * | 12/2012 | Jung et al. | 370/328 |
| 2013/0029697 | A1 * | 1/2013 | Jung et al. | 455/458 |
| 2013/0102311 | A1 * | 4/2013 | Park et al. | 455/435.1 |

FOREIGN PATENT DOCUMENTS

CN 101167396 4/2008

OTHER PUBLICATIONS

Hyunjeong Kang, "Proposed text change for multicarrier idle mode (16.2.8.2.10.2)", IEEE 802.16 Broadband Wireless Access Working Group <http://ieee802.org/16>, Jul. 13, 2010, 5pages.
IEEE C802.16m-10/0819r1, Proposed text change for multicarrier idle mode, (Jul. 13, 2010).
"First Office Action of China Counterpart Application", issued on Apr. 3, 2013, p. 1-p. 7.

* cited by examiner

Primary Examiner — Tilahun B Gesesse
(74) Attorney, Agent, or Firm — Jianq Chyun IP Office

(57) ABSTRACT

A carrier assignment method, a multi-carrier base station and a wireless communication device using the same are proposed. The carrier assignment method is adapted for assigning carriers in a paging group for an ABS with multi-carriers, and includes the following step. At least two paging carriers is assigned in a paging group, where all assigned carriers belonging to a paging group are in the same frequency band. Also, small but close frequency bands are grouped into a super band, where different carriers in different super bands are assigned into different paging groups. The wireless communication device determines the paging carrier index for itself by a mapping function of a mobile identification and the number of carriers. The paging message for the wireless communication device is sent only on the paging carrier corresponding to the determined paging carrier index.

39 Claims, 6 Drawing Sheets

PAGING CARRIER ASSIGNMENT METHOD, MULTI-CARRIER BASE STATION AND WIRELESS COMMUNICATION DEVICE USING THE SAME

CROSS-REFERENCE TO RELATED APPLICATION

This application claims the priority benefit of U.S. provisional application Ser. No. 61/290,771, filed on Dec. 29, 2009. The entirety of the above-mentioned patent application is hereby incorporated by reference herein and made a part of this specification.

BACKGROUND

1. Technical Field

The invention relates to a paging carrier assignment method for a multi-carrier system, and particularly, relates to a paging carrier assignment method for a paging group in a multi-carrier system and a multi-carrier base station and a wireless communication device using the same.

2. Related Art

A multi-carrier system has multiple carriers. If the multi-carrier system can not know on which carrier an advanced mobile station (AMS) camps, the multi-carrier system broadcasts identical paging messages on all carriers, i.e., paging messages are duplicated to all carriers. More specifically, this approach groups multiple carriers into one paging group, and an AMS can receive paging messages through any one of the carriers belong to the paging group. However, the paging message must be duplicated into multiple copies, for example, four copies duplicated for four paging carriers. Apparently, this approach does not take advantage of multi-carrier and there is no significant gain to paging capacity coming from multi-carrier.

In order to save radio resource, the multi-carrier system can configure an AMS receiving paging message on just one carrier and thus reduces paging message overhead. However, an AMS may move from a current serving cell to another cell. If the AMS can not know on which carrier the paging information is broadcasted after moving to another cell, the AMS shall send a location update message to the multi-carrier system so as to find out the selected paging carrier. If an AMS is in idle state, the AMS must perform network entry procedures for acquiring the selected paging carrier so that significant radio resource is consumed and this approach creates new problem and is uneconomical.

For example, a multi-carrier system assigns four carriers as one paging group but different AMSs may fetch paging messages on different carriers as illustrated in FIG. 1A. FIG. 1A is a schematic diagram illustrating an example of paging groups mapping for two advanced base stations (ABS). Referring to FIG. 1A, the multi-carrier system has at least two ABSs (labeled as BS1 and BS2). Within the coverage of the BS1, four carriers are grouped into one paging group, where BS1 uses carriers 1, 3, 5, 7, and BS2 uses carriers 2, 4, 6, 8. The four carriers (such as carrier 1, carrier 3, carrier 5 and carrier 7) are grouped into one paging group 1 in the MS1. Besides, a first AMS (i.e., MS1) just fetches paging message on carrier 1, a second AMS (i.e., MS2) just fetches paging message on carrier 3, a third AMS (i.e., MS3) just fetches paging message on carrier 5 and a fourth AMS (i.e., MS4) just fetches paging message on carrier 7. In this case, the message is not duplicated and the system can have more capacity to support more users in a paging system.

However, an AMS may move within the multi-carrier network as shown in FIG. 1B. FIG. 1B is a schematic diagram illustrating an AMS (such as MS shown in FIG. 1B) move among different advanced base stations (such as BS1, BS2, BS3 and BS4 in FIG. 1B) in a multi-carrier network 10. Referring to FIG. 1B, an AMS moves from the coverage of BS1 to the coverage of BS2, further to the coverage BS3 and to the coverage BS4 at last. According to the mapping shown in FIG. 1A, if the MS is the MS2, the paging carrier on which the MS fetches has to be changed from carrier 3 to carrier 8 when the MS is moved (i.e., handover or roam) from the BS1 to the BS2. However, the MS2 may not support the carrier 8, which is in a different band to the carrier 3. Thus, the MS2 may not camp on correct carrier and lose paging information when handover to the BS2. In such a situation, the MS2 must request the BS2 to re-assign a paging group or carrier to itself, and this carrier re-assignment process requires data updated in databases in the backhaul or the core network of the multi-carrier system, thereby consuming more system resources and time. Therefore, it is an important issue to find an effective and efficient carrier assignment scheme so as to lower the probability of carrier re-assignment process in a multi-carrier system.

SUMMARY

Accordingly, the invention proposes a paging carrier assignment method and a multi-carrier base station and a wireless communication device using the same. The paging carrier assignment method assigns at least two paging carriers in the same frequency band into a paging group or assigns paging carriers in the same super band into a paging group, so as to avoid the situation of being un-accessible to paging carriers and losing paging information when an AMS handovers or roams from one ABS to another ABS in a multi-carrier system. Also, the AMS can locally determine the paging carrier index associated with the paging carriers based on the number of carriers broadcasted from the serving ABS and a mobile identification by a mapping function. Accordingly, probability of re-assigning paging carrier is lowered, thereby reducing the amount of information delivered for paging carrier assignment.

A paging carrier assignment method is introduced herein. The paging carrier assignment method is adapted for assigning carriers in a paging group for an ABS with multi-carriers, and includes the following step. At least two carriers are assigned in a paging group, where all assigned carriers belonging to a paging group are in the same frequency band.

A multi-carrier base station is introduced herein. The multi-carrier base station includes a transceiver module configured for sending paging information for a paging group, where the paging group includes at least two paging carriers, and said at least two paging carriers belong to a paging group are in the same frequency band.

A wireless communication device is introduced herein. The wireless communication device is adapted for calculating paging carrier index of a paging group in a multi-carrier system. According to an exemplary embodiment, the wireless communication device includes a transceiver module and a protocol stack module. The protocol stack module further includes a paging carrier index calculation unit. The transceiver module is configured for receiving paging group identifier (PGID) information message which indicates paging carriers assigned to a paging group belonging to a frequency band, where the assigned paging carriers belonging to a paging group is indicated by an indication bitmap, e.g., PGID_Info in IEEE 802.16m. The protocol stack module is coupled to the transceiver module and is configured for receiving the PGID information message from the transceiver module. The paging carrier index calculation unit is configured for calculating a paging carrier index according to the number of carriers broadcasted in the PGID information message by using a mapping function. In addition, the paging carrier index is associated with paging carriers on which transceiver module monitors paging messages when the wireless communication device is in an idle state.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF THE EXEMPLARY EMBODIMENTS

Figure 1A:
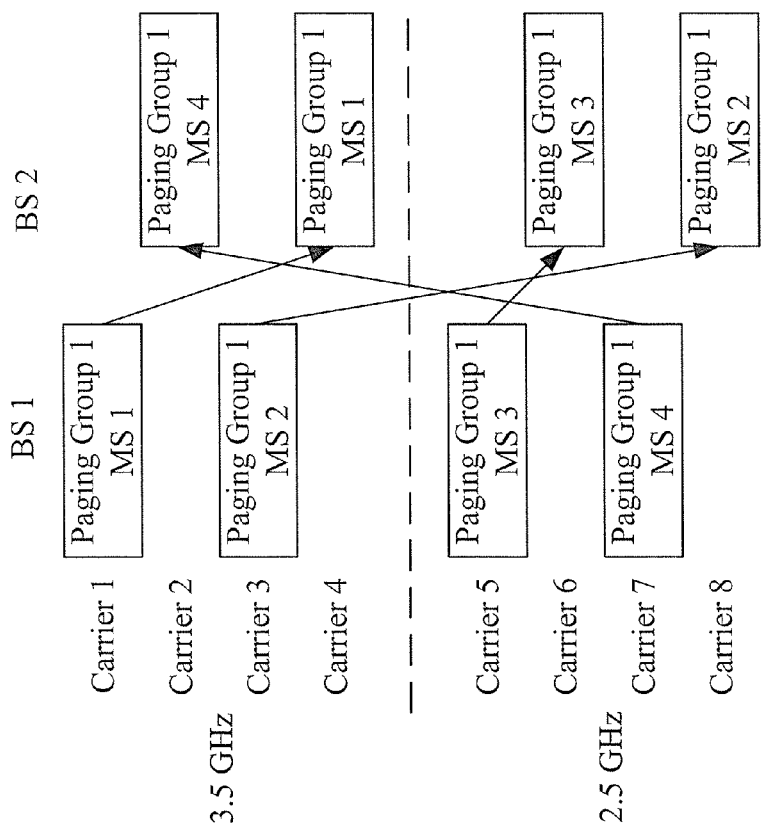
FIG. 1A is a schematic diagram illustrating an example of paging groups mapping for two advanced base stations.

Reference will now be made in detail to the exemplary embodiments of the present invention, examples of which are illustrated in the accompanying drawings. Wherever possible, the same reference numbers are used in the drawings and the description to refer to the same or like parts.

Throughout the disclosure of the invention, the term "AMS" is used for IEEE 802.16 or Worldwide Interoperability for Microwave Access (WiMAX) system such as IEEE 802.16m system. However, the main concept of the invention can also be applied to other wireless multi-carrier systems such as 3GPP long term evolution (LTE) system. Moreover, the term "AMS" can also mean a "mobile station" (MS) or a "user equipment" (UE), and the term "ABS" can also mean a "Base Station" (BS) or a "Node B" or an "enhanced node B" (eNodeB) in other wireless multi-carrier systems. In addition, the AMS can be wireless communication devices such as a smartphone, a notebook, a netbook, a television, a personal computer (PC) and a tablet PC.

The invention proposes a paging carrier assignment method and a multi-carrier base station and a wireless communication device using the same. The proposed paging carrier assignment method can be used for assigning paging carriers in a paging group in a multi-carrier system which includes at least an ABS and at least an AMS. At least two paging carriers are assigned in a paging group based on frequency bands, where paging messages for the AMS are transmitted on only one of the assigned paging carriers when the AMS is in an idle state. Different carriers in different frequency bands are assigned into different paging groups. Also, small but close frequency bands can be grouped into a super band before carriers are assigned in a paging group, where different carriers in different super bands are assigned into different paging groups. The AMS receives paging group identifier (PGID) information message, monitors the number of carriers broadcasted by the ABS, and calculates the paging carrier index locally by a mapping function of mobile identification and the number of carriers.

In IEEE 802.16m, a mobile station identification such as the deregistration identification (DID) is used to generate the associated paging carrier for an AMS within a paging area, where a paging area can be formed by, for example, 10 ABSs. A paging carrier index is generated based on a mapping function shown as below:

$$\text{paging carrier index} = \text{DID modulo } N \qquad \text{equation (1),}$$

where, DID is a mobile identification assigned to an AMS in a paging area, modulo is modulo function, and the value of N is the number of carriers per paging group (PG) for an ABS.

Also, the mapping function in the equation (1) can be a Hash function. However, the invention is not limited to the deregistration identification, and in other embodiments of the invention, the associated paging carrier for an AMS within a paging area can be generated according to a mobile identification assigned by an ABS in a multi-carrier system to the AMS, where the mobile identification is the same in the same location area. For example, if there are 100 AMSs in the coverage of the serving ABS, then each one of the 100 AMSs will be assigned with a unique mobile identification to distinguish each one of the AMSs from other AMSs. Then, ABSs broadcast paging signal with the unique mobile identification which is previously assigned to a specific AMS. In some embodiments of the invention, the unique mobile identification is mobile station identification (MSID). Alternatively, the unique mobile identification is international mobile station identification (IMSI).

An AMS may not support some bands of a multi-carrier system but the multi-carrier system may broadcast a message on one of the bands which are un-accessible by the AMS. For example, referring to FIG. 1A, the BS1 uses carriers on both bands of 2.5 GHz and 3.5 GHz bands, but an AMS (such as the MS4 shown in FIG. 1A) can just access (or support) 2.5 GHz band as shown in FIG. 1A. If paging carriers are not well-chosen, the AMS (such the MS4) will be directed to 3.5 GHz for receiving paging information. The AMS has to perform a location update to request a new PG for itself since the carrier 2 is un-accessible to the AMS. Consequently, the backhaul must further update the associated registration and thus more system resource is consumed on paging carrier assignment in the multi-carrier system.

A paging system (or a multi-carrier system) is capable of operating on multiple bands. In an exemplary embodiment of the invention, a multi-carrier system can allocate a plurality of carriers within the same band into a PG. The HASH function or other mapping function can be used to generate the corresponding paging carrier index of a PG on each ABS. An AMS can further acquire the corresponding paging carrier based on the number of carriers broadcast by each ABS and the existing mapping function (pre-defined in the multi-carrier system or informed by the serving ABS).

In the IEEE 802.16 system, the band class for the IEEE 802.16m system is shown in Table I. In the present exemplary embodiment, the PG can be allocated based on frequency bands. In other words, the paging group can be allocated based on the band class. To be more specific, the paging carrier assignment method is implemented based on base class, where carriers belonging to different band class are not allocated (assigned) in a PG so as to avoid the situation where an AMS is directed to an un-accessible carrier.

TABLE I

| Band Class | UL AMS Transmit Frequency (MHz) | DL AMS Receive Frequency (MHz) | Duplex Mode |
|---|---|---|---|
| 1 | 2300-2400 | 2300-2400 | TDD |
| 2 | 2305-2320, 2345-2360 | 2305-2320, 2345-2360 | TDD |
|  | 2345-2360 | 2305-2320 | FDD |
| 3 | 2496-2690 | 2496-2690 | TDD |
|  | 2496-2572 | 2614-2690 | FDD |
| 4 | 3300-3400 | 3300-3400 | TDD |
| 5L | 3400-3600 | 3400-3600 | TDD |
|  | 3400-3500 | 3500-3600 | FDD |
| 5H | 3600-3800 | 3600-3800 | TDD |
| 6 | 1710-1770 | 2110-2170 | FDD |
|  | 1920-1980 | 2110-2170 | FDD |
|  | 1710-1755 | 2110-2155 | FDD |
|  | 1710-1785 | 1805-1880 | FDD |
|  | 1850-1910 | 1930-1990 | FDD |
|  | 1710-1785, 1920-1980 | 1805-1880, 2110-2170 | FDD |
|  | 1850-1910, 1710-1770 | 1930-1990, 2110-2170 | FDD |
| 7 | 698-862 | 698-862 | TDD |
|  | 776-787 | 746-757 | FDD |
|  | 788-793, 793-798 | 758-763, 763-768 | FDD |
|  | 788-798 | 758-768 | FDD |
|  | 698-862 | 698-862 | TDD/FDD |
|  | 824-849 | 869-894 | FDD |
|  | 880-915 | 925-960 | FDD |
|  | 698-716, 776-793 | 728-746, 746-763 | FDD |
| 8 | 1785-1805, 1880-1920, 1910-1930, 2010-2025, 1900-1920 | 1785-1805, 1880-1920, 1910-1930, 2010-2025, 1900-1920 | TDD |
| 9 | 450-470 | 450-470 | TDD |
|  | 450.0-457.5 | 462.5-470.0 | FDD |

Referring to Table I, each band class includes one carrier or a plurality of carriers. For example, band class 1 can be grouped as a PG which includes a plurality of carriers from 2.3 GHz to 2.4 GHz. Take band class 5L in Table I for another example, band class 5L can also be grouped as another PG, which includes a plurality of uplink carriers from 3.4 GHz to 3.5 GHz and downlink carriers from 3.5 GHz to 3.6 GHz.

Figure 2:
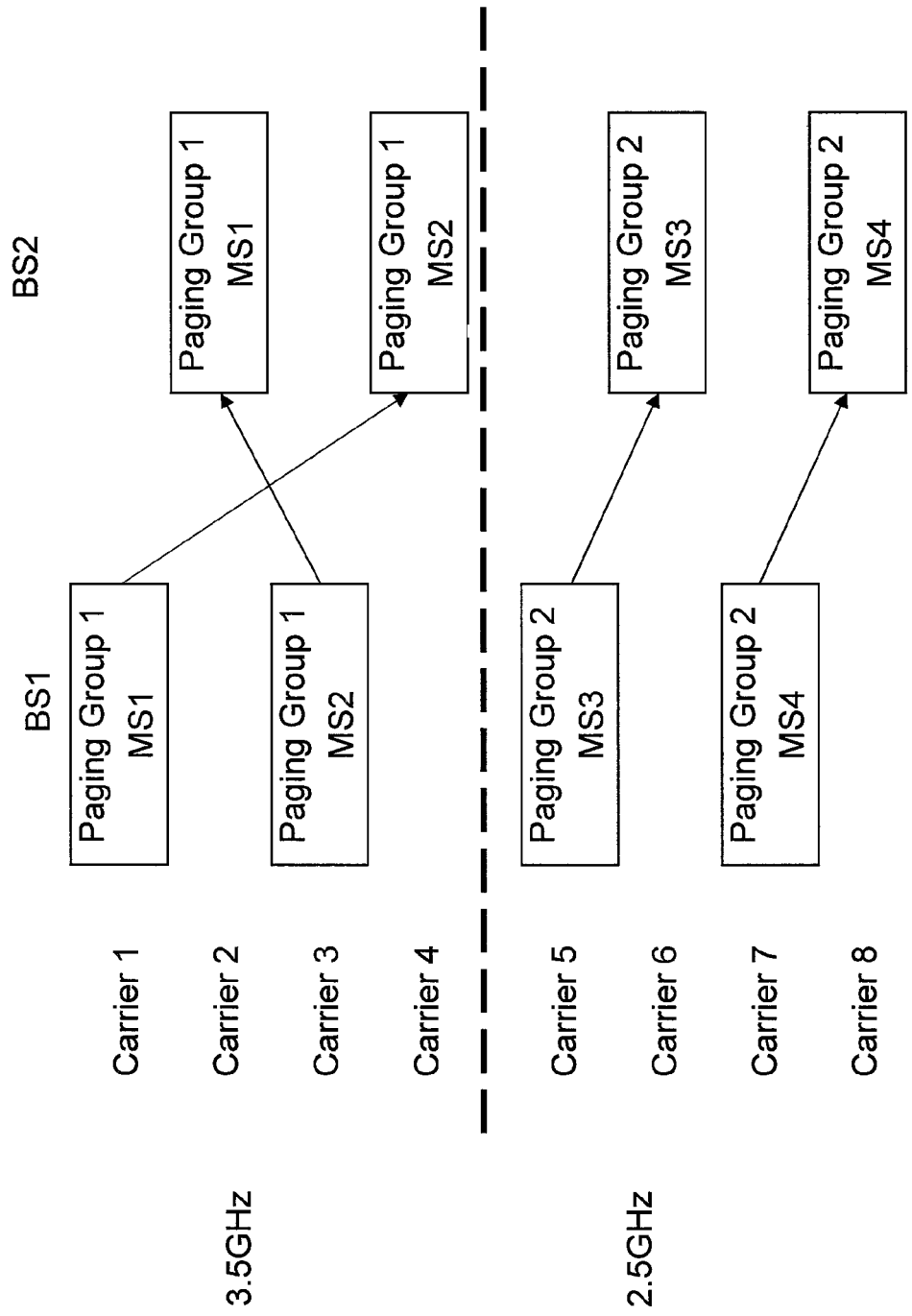
FIG. 2 is schematic diagram illustrates carriers within the same frequency band allocated as a group.

In the IEEE 802.16 system, an ABS can support more than one band. If there are two bands in a multi-carrier system, where one band is located around 3.5 GHz and the other band is allocated around 2.5 GHz, the multi-carrier system can allocate carriers within the same frequency band as a group. FIG. 2 is schematic diagram illustrates carriers within the same frequency band allocated as a group, where it is assumed that an AMS must support all carriers within the same frequency band.

Referring to FIG. 2, in the first ABS (i.e., BS1), the paging group 1 includes carrier 1 and carrier 2 in 3.5 GHz band, and the paging group 2 includes carrier 5 and carrier 7 in 2.5 GHz band. In the second ABS (i.e., BS2), the paging group 1 includes carrier 2 and carrier 4 in 3.5 GHz band, and the paging group 2 includes carrier 6 and carrier 8 in 2.5 GHz band. Apparently, there is no hardware limitation preventing an AMS from accessing paging information even if the AMS just supports one band. As can be seen in FIG. 2, MS1 and MS2 always access paging information on 3.5 GHz band, and MS3 and MS4 always access paging information on 2.5 GHz band.

An AMS can access some bands out of multiple bands of the paging system or the multi-carrier system. In an exemplary embodiment of the invention, the multi-carrier system can group these accessible multiple bands into a super band based on the AMS capability (or the device capability), where the bands being grouped into a super band are adjacent to each other or very close to each other. Also, the device capability refers to the predetermined bands that an AMS can access. In the present exemplary embodiment, the supper band can also be determined according to device capability of the AMS, where the device capability includes a plurality of device classes and each one of the device classes represents predetermined bands which are accessible to the AMS belonging to said device class.

The multi-carrier system can further allocate a plurality of carriers within the same super band into a PG Then, an existing mapping function such as the HASH function shown in the equation (1) can be used to generate the corresponding paging carrier index of a PG on each ABS. An AMS can acquire corresponding paging carrier based on the number of carriers broadcasted in the multi-carrier system and the mobile identification by using the mapping function. Usually, an ABS periodically broadcast which carriers the ABS currently supports such that the AMSs receiving the broadcast are aware of the paging carriers for accessing the paging information in order to further calculate the number of carriers supported in the serving cell.

Evolved-Universal Terrestrial Radio Access (E-UTRA) operating bands listed in the technical document of 3GPP Technical Specification (TS) 36.101 version 8.7.0 is as shown in Table II. Referring to Table II, some bands are very close, for example, bands 12, 17. A multi-carrier system can configure or group small but close bands into a super band, for example, bands 12, 17 can be configured as a super band. If there is a paging, the paging information can be broadcast on the grouped super band. Also, since the grouped super band includes close bands, an AMS can access these bands without hardware limitation. In other exemplary embodiments, the close bands can also be grouped according to the device capability (or the AMS capability).

TABLE II

| 1 | 1920 MHz-1980 MHz | 2110 MHz-2170 MHz | FDD |
|---|---|---|---|
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

Figure 3:
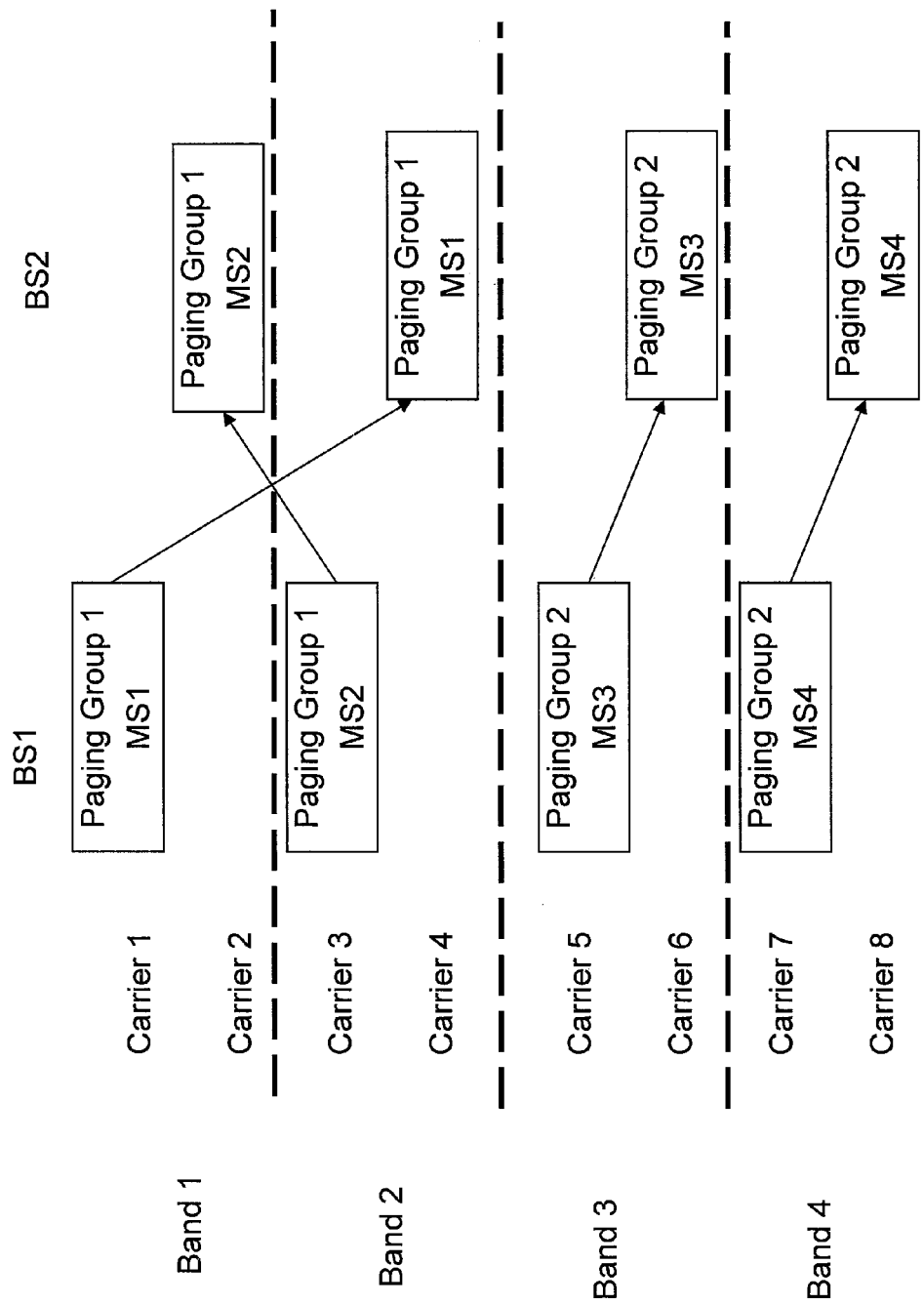
FIG. 3 is schematic diagram illustrates carriers within a super band allocated as a group.

In the present exemplary embodiment, if there are four bands, the multi-carrier system can group band 1 and band 2 into a first super band, and group band 3 and band 4 into a second super band. The multi-carrier system can then further allocate carriers within a super band into a PG. FIG. 3 is schematic diagram illustrates carriers within a super band allocated as a group. Referring to FIG. 3, in BS1, the paging group 1 includes carrier 1 in band 1 and carrier 2 in band 2, where the band 1 and the band 2 is close to each other and can be grouped as a super band. On the other hand, in the BS1, the paging group 2 includes carrier 5 in band 3 and carrier 7 in band 4, where the band 3 and the band 4 are close to each other and can be grouped as another super band. In BS2, the paging group 1 includes carrier 2 in the band 1 and carrier 4 in the band 2, and the paging group 2 includes carrier 6 in the band 3 and carrier 8 in the band 4. There is no hardware limitation resisting paging information access, MS 1 and MS2 can always access paging information on the super band which includes the band 1 and the band 2, and MS3 and MS4 can always access paging information on the super band which includes the band 3 and the band 4.

Figure 4:
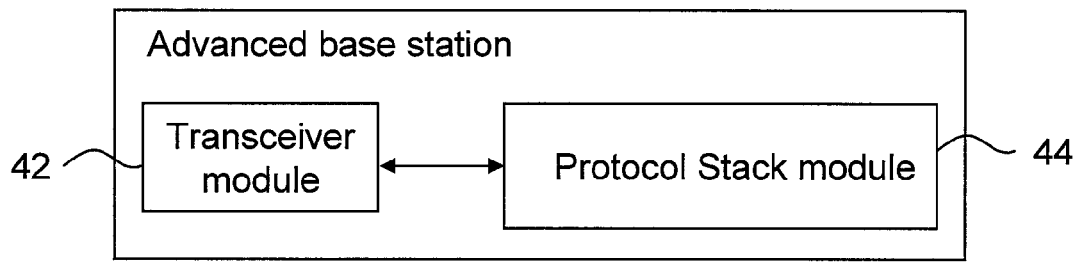
FIG. 4 is a functional block diagram of an advanced base station according to an exemplary embodiment of the invention.

FIG. 4 is a functional block diagram of an advanced base station 40 according to an exemplary embodiment of the invention. The ABS 40 includes at least a transceiver module 42 and a protocol stack module 44. The protocol stack module 44 is configured for providing paging group identifier information (PGID_Info) message, paging message and mobile identifications to the transceiver module 42. The transceiver module 42 is then configured for sending PGID_Info message for a PG, where the PG includes more than two paging carriers, and the paging carriers assigned to the PG are in the same frequency band. The transceiver module 42 also transmits paging message and mobile identifications assigned to AMSs within its coverage. The ABS 40 can be, for example, one of BS1, BS2, BS3 and BS4 shown in FIG. 1B. The ABS 40 can further include an antenna module (not illustrated), a memory module (not illustrated) and a processor module (not illustrated).

Figure 5:
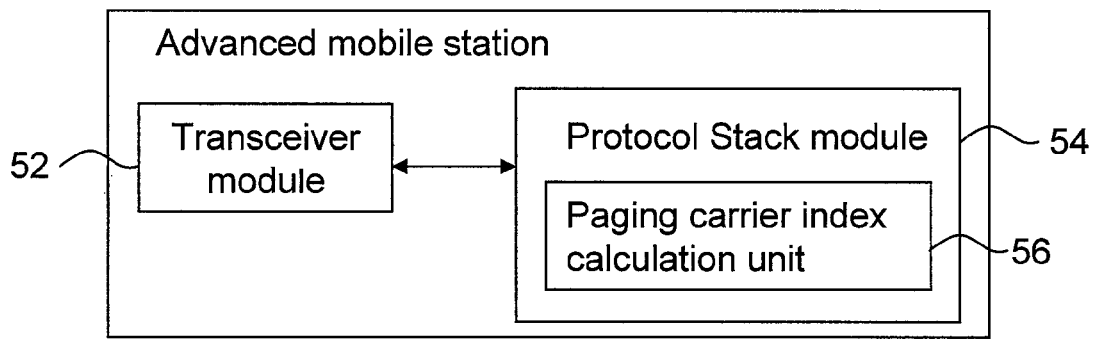
FIG. 5 is a functional block diagram of an advanced mobile station according to an exemplary embodiment of the invention.

FIG. 5 is a functional block diagram of an advanced mobile station 40 according to an exemplary embodiment of the invention. The AMS 50 includes at least a transceiver module 52, a protocol stack module 54. The protocol stack module 54 includes at least a paging carrier index calculation unit 56. The AMS 50 can be, for example, the MS shown in FIG. 1B and can further include an antenna module (not illustrated), a memory module (not illustrated) and a processor module (not illustrated).

In the present exemplary embodiment, the transceiver module 52 receives PGID_Info message, which indicates the assigned carriers of a PG belonging to a frequency band. The assigned carriers belonging to the PG are indicated by an indication bitmap. The protocol stack module 54 also receives the PGID_Info message from the transceiver module 52. The paging carrier index calculation unit 56 calculates a paging carrier index according to the number of carriers broadcast in the PGID_Info message and the mobile identification by using a mapping function, for example, the mapping function as described in the equation (1). In addition, the paging carrier index is corresponding to the paging carriers on which the transceiver module 52 monitors paging message when the AMS 50 is in an idle state, where the PG includes at least two paging carriers.

Figure 6:
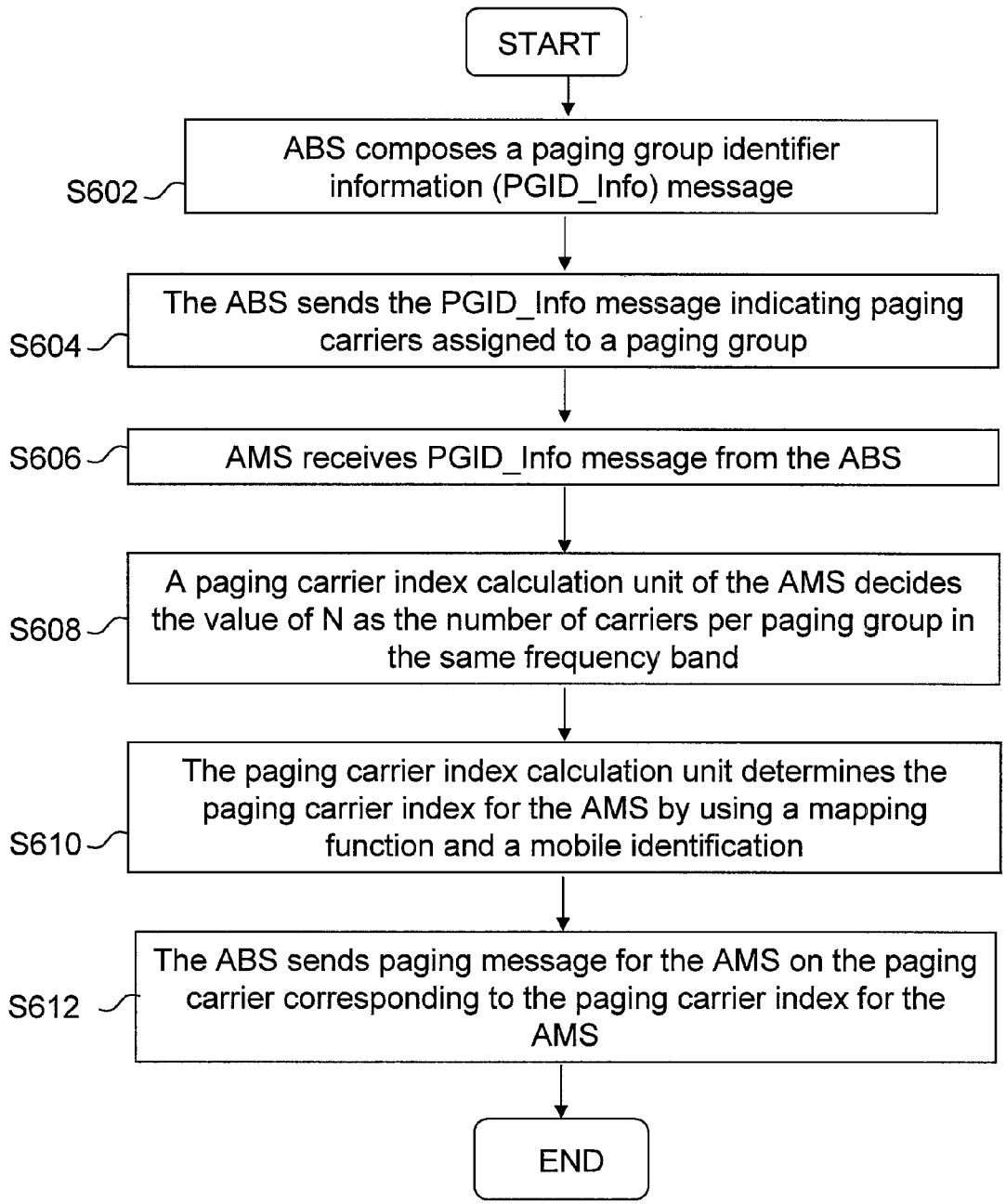
FIG. 6 is a flowchart illustrating a carrier assignment method according to an exemplary embodiment of the invention.

FIG. 6 is a flowchart illustrating a paging carrier assignment method 60 according to an exemplary embodiment of the invention. In general, at least two paging carriers are in a PG based on frequency bands in the paging carrier assignment method 60, where paging carriers are used for sending paging message for an AMS when the AMS is in an idle state. Also, different carriers in different frequency bands are assigned into different PGs. Moreover, the AMS monitors the number of carriers broadcast by the ABS, receives the mobile identification assigned by the ABS, and calculates the paging carrier index according to the number of carriers and the mobile identification by a mapping function.

Figure 1B:
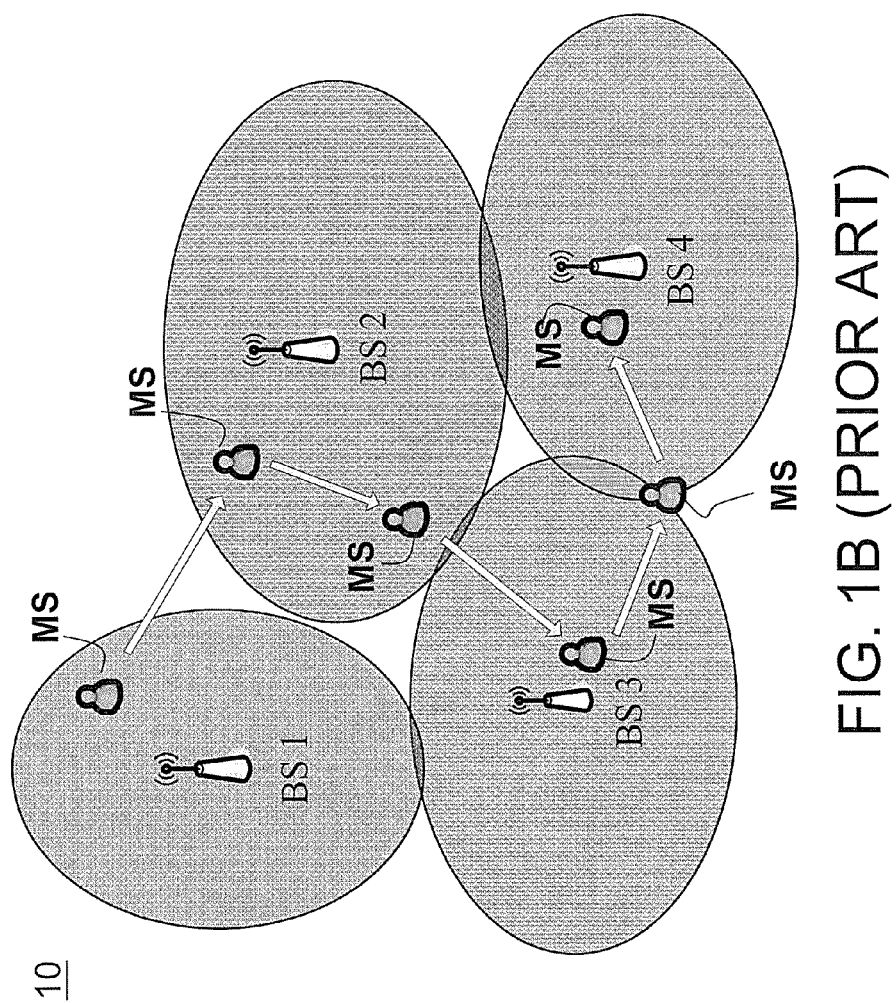
FIG. 1B is a schematic diagram illustrating an advance mobile station move among different base stations in a multi-carrier network.

Referring to both FIG. 1B, FIG. 5 and FIG. 6, the carrier assignment method 60 can be applied to a multi-carrier system including at least an ABS 40 and at least an AMS 50, and starts at step S602. In step S602, the ABS 40 composes a PGID_Info message which includes an indication bitmap for indicating paging carriers assigned to a PG, where the all assigned paging carriers of the PG are in the same frequency band.

In another exemplary embodiment of the invention, in the step S602, close bands may also be grouped into a pre-defined super band, where at least two paging carriers are assigned into a PG based on the pre-defined super bands. A pre-defined super band is grouped from a plurality of frequency bands. The grouping mechanism of the super bands can be performed according to the technique described previously in the disclosure related to Table II. In such exemplary embodiment, it is assumed that the information about which paging carriers are grouped into a super band is also delivered or broadcasted to all AMSs within the multi-carrier system. Moreover, if an AMS can access to a super band, it means that all carriers within the super band should be accessible to the AMS.

In step S604, the ABS 40 sends the PGID_Info message on only one of the assigned carriers belonging to the PG The PGID_Info message is broadcasted by the ABS 40, and the PGID_Info message indicates the assigned carriers of a PG belonging to a same frequency band. Also, the PGID_Info message may be carried in the neighboring advertisement message or multi-carrier configuration message, where neighboring advertisement message advertises carrier configuration of the neighboring ABSs and multi-carrier configuration messages advertise multi-carrier configuration of an ABS.

For example, in IEEE 802.16m, an ABS may apply Advanced Air Interface Neighbor Advertisement (AAI_NBR-ADV) message as neighboring advertisement message and the Advanced Air Interface Multi-carrier Advertisement (AAI_MC-ADV) message as multi-carrier configuration message. Either one of the neighboring advertisement message and the multi-carrier configuration message, or both messages can carry paging group identifier information which indicates the value of N as the number of carriers per paging group (PG) in the same frequency band. An AMS receives one of the messages to decide the value of N as the number of carriers per PG in the same frequency band. For example, the transceiver module 52 of the AMS 50 receives the AAI_NBR-ADV message or the AAI_MC-ADV message, and the protocol stack module 54 of the AMS 50 extracts the information from the AAI_NBR-ADV message or the AAI_MC-ADV message.

In step S606, the AMS 50 receives PGID_Info message from the ABS 40. For example, the AMS may monitor the PGID_Info message at the same frequency band where the AMS 50 has most recently woken. Also, the transceiver module 42 can perform monitoring of the PGID_Info message in the frequency band which the AMS 50 has device capability to access. In other words, the transceiver module 42 along with the antenna coupled to the transceiver module 42 has hardware capability to receive the PGID_Info message on paging carriers in the frequency band.

In step S608, the paging carrier index calculation unit 56 of the AMS 50 decides the value of N as the number of carriers per PG in the same frequency band.

In step S610, the paging carrier index calculation unit 56 determines the paging carrier index for the AMS 50 by using a mapping function and a mobile identification. For example, the paging carrier index calculation unit 56 may calculate the paging carrier index by the mapping function in the equation (1). To be more specific, the paging carrier index can be determined according to the number of carriers, N, and a mobile identification assigned to the AMS 50 in a paging area. The mapping function can be, for example, a HASH function of the mobile identification and the number of carriers. Moreover, the mobile identification can be, for example, a deregistration identification in IEEE 802.16m standard or a mobile station identification.

For another example, referring to FIG. 2, suppose a paging group 1 includes carriers 1, 2, 3 and 4, and the associated paging index for the carriers 1, 2, 3 and 4 are respectively 0, 1, 2 and 4. If the paging carrier index calculation unit 56 calculates the paging index as 1 according to the aforementioned process, then the transceiver module 52 knows that the carrier 2 of the paging group 1 is the paging carrier that should be monitored. Also, the protocol stack module 44 of the ABS 40 executes the same procedures as described in the step S608 and the step S610 in order to determine the paging carrier index for the AMS 50.

In step S612, paging message for the AMS 50 is sent by the ABS 40 on the paging carrier corresponding to the paging carrier index for the AMS 50. The carrier assignment method 60 is terminated after the step S612. The step S602 to the step S612 can be continuously repeated as long as the AMS 50 is in the coverage of the ABS 40 or in the same paging area to which the ABS 40 belongs.

In summary, according to the exemplary embodiments of the invention, a paging carrier assignment method and multi-carrier base station and a wireless communication device using the same are proposed. Carriers in the same frequency band are assigned into a PG. Alternatively, carriers in the pre-defined super band formed by close frequency bands are assigned into a PG. Thus, the probability of being un-accessible to paging carriers is reduced, when an AMS handovers or roams from one ABS to another ABS in a multi-carrier system. Also, the paging carrier index associated with the paging carriers can be determined locally at an AMS based on the number of carriers broadcasted from the ABS and the mobile identification by a mapping function such that less system resource is consumed.

It will be apparent to those skilled in the art that various modifications and variation can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A paging carrier assignment method, adapted for assigning carriers in a paging group for an ABS with multi-carriers, wherein the carrier assignment method comprises:
   assigning at least two carriers in the paging group by the ABS, wherein the at least two assigned carriers belonging to the paging group are in the same frequency band;
   deciding the value of N as the number of carriers per paging group in the same frequency band, wherein N>1;
   determining a paging carrier index for the AMS by a mapping function and a mobile identification; and
   sending paging message on the carrier corresponding to the paging carrier index for the AMS.

2. The paging carrier assignment method according to claim 1 further comprising:
   sending paging message for an AMS is on just one of the assigned carriers belonging to the paging group.

3. The paging carrier assignment method according to claim 1 further comprising:
   broadcasting a PGID_Info message which indicates the assigned carriers of a paging group belonging to a frequency band.

4. The paging carrier assignment method according to claim 3, wherein the assigned carriers belonging to a paging group are indicated by an indication bitmap.

5. The paging carrier assignment method according to claim 3, wherein the PGID_Info message is carried by neighboring advertisement message or an Advanced Air Interface Neighbor Advertisement (AAI_NBR-ADV) message or multi-carrier configuration message or an Advanced Air Interface Multi-carrier Advertisement (AAI_MC-ADV) message.

6. The method according to claim 1, wherein the mapping function is described as the following equation:

$$\text{paging carrier index} = DID \text{ modulo } N,$$

wherein DID is a mobile identification assigned to the AMS in a paging area, modulo is modulo function, the value of N is the number of carriers per paging group for the ABS.

7. The method according to claim 1, wherein the mapping function is a HASH function of mobile identification and the number of carriers.

8. The method according to claim 7, wherein the mobile identification is a deregistration identification defined in IEEE 802.16m standard.

9. The method according to claim 7, wherein the mobile identification is mobile station identification.

10. The paging carrier assignment method according to claim 1, wherein the carrier assignment method further comprises:
    sending paging message on the carrier corresponding to a paging carrier index assigned for the AMS.

11. The paging carrier assignment method according to claim 1, wherein paging carriers belonging to different bands are assigned into different paging groups.

12. The paging carrier assignment method according to claim 1, wherein the frequency band is a pre-defined super band, wherein the pre-defined super band is grouped from multiple frequency bands.

13. The paging carrier assignment method according to claim 12, wherein paging carriers belonging to different super bands are assigned into different paging groups.

14. The paging carrier assignment method according to claim 12, wherein the super band is determined according to device capability of the AMS, wherein the device capability includes a plurality of device classes, and each one of the device classes represents predetermined bands which are accessible to the AMS belonging to said device class.

15. A multi-carrier base station comprising:
    a transceiver module configured for sending paging information for a paging group, wherein the paging group comprises at least two paging carriers, and said at least two paging carriers which belong to the paging group are in the same frequency band;
    a protocol stack module further decides the value of N as the number of carriers per paging group in the same frequency band, and determines the paging carrier index for the AMS by a mapping function and a mobile identification, wherein N>1; and
    the transceiver module further sends paging message on the carrier corresponding to the paging carrier index for the AMS.

16. The multi-carrier base station according to claim 15, wherein transceiver module sends paging message for an AMS on only one of the paging carriers belonging to the paging group.

17. The multi-carrier base station according to claim 15, wherein the transceiver module further broadcasts a PGID_Info message which indicates assigned carriers of a paging group belonging to a frequency band.

18. The multi-carrier base station according to claim 17, wherein the assigned carriers belonging to a paging group are indicated by an indication bitmap.

19. The multi-carrier base station according to claim 17, wherein the PGID_Info message is carried by neighboring advertisement message or an Advanced Air Interface Neighbor Advertisement (AAI_NBR-ADV) message or multi-carrier configuration message or an Advanced Air Interface Multi-carrier Advertisement (AAI_MC-ADV) message.

20. The multi-carrier base station according to claim 15, wherein the mapping function is described as the following equation:

paging carrier index=DID modulo N, wherein DID is a mobile identification assigned to an AMS in a paging area, modulo is modulo function, the value of N is the number of carriers per paging group for the ABS.

21. The multi-carrier base station according to claim 15, wherein the mapping function is a HASH function of mobile identification and the number of carriers.

22. The multi-carrier base station according to claim 15, wherein the mobile identification is a deregistration identification defined in IEEE 802.16m standard.

23. The multi-carrier base station according to claim 21, wherein the mobile identification is mobile station identification.

24. The multi-carrier base station according to claim 15, wherein paging carriers belonging to different bands are assigned into different paging groups.

25. The multi-carrier base station according to claim 15, wherein the frequency band is a pre-defined super band, wherein the pre-defined super band is grouped from multiple frequency bands.

26. The multi-carrier base station according to claim 25, wherein paging carriers belonging to different super bands are assigned into different paging groups.

27. The multi-carrier base station according to claim 25, wherein the super band is determined according to device capability of the AMS, wherein the device capability includes a plurality of device classes and each one of the device classes represents predetermined bands which are accessible to the AMS belonging to said device class.

28. A wireless communication device, adapted for calculating paging carrier index of a paging group in a multi-carrier system, wherein the wireless communication device comprises:
   a transceiver module, configured for receiving paging group identifier (PGID) information message which indicates paging carriers assigned to the paging group belonging to a frequency band, wherein the assigned paging carriers belonging to the paging group are indicated by an indication bitmap; and
   a protocol stack module, coupled to the transceiver module, configured for receiving the PGID information message from the transceiver module, wherein the protocol stack module comprises:
   a paging carrier calculation circuit, configured for calculating the a paging carrier index corresponding to the paging carriers on which the paging message is received, wherein the paging group comprises at least two paging carriers.

29. The wireless communication device according to claim 28, wherein the transceiver module receives a PGID_Info message which indicates assigned carriers of a paging group belonging to a frequency band.

30. The wireless communication device according to claim 28, wherein the PGID_Info message is carried by neighboring advertisement message or an Advanced Air Interface Neighbor Advertisement (AAI_NBR-ADV) message or multi-carrier configuration message or an Advanced Air Interface Multi-carrier Advertisement (AAI_MC-ADV) message.

31. The wireless communication device according to claim 28, wherein the paging carrier calculation circuit further decides the value of N as the number of carriers per paging group in the same frequency band, wherein N>1, and determines the paging carrier index for the wireless communication device by a mapping function and a mobile identification, and the transceiver module receives paging message on the carrier corresponding to the paging carrier index for the wireless communication device.

32. The wireless communication device according to claim 31, wherein the mapping function is described as the following equation:

paging carrier index=DID modulo N, wherein DID is a mobile identification assigned to the wireless communication device in a paging area, modulo is modulo function, the value of N is the number of carriers per paging group for the wireless communication device.

33. The wireless communication device according to claim 31, wherein the mapping function is a HASH function of mobile identification and the number of carriers.

34. The wireless communication device according to claim 31, wherein the mobile identification is a deregistration identification defined in IEEE 802.16m standard.

35. The wireless communication device according to claim 31, wherein the mobile identification is mobile station identification.

36. The wireless communication device according to claim 28, wherein paging carriers belonging to different bands are assigned into different paging groups.

37. The wireless communication device according to claim 28, wherein the frequency band is a pre-defined super band, wherein the pre-defined super band is grouped from multiple frequency bands.

38. The wireless communication device according to claim 37, wherein paging carriers belonging to different super bands are assigned into different paging groups.

39. The wireless communication device according to claim 37, wherein the super band is determined according to device capability of the wireless communication device, wherein the device capability includes a plurality of device classes, and each one of the device classes represents predetermined bands which are accessible to the wireless communication device belonging to said device class.

* * * * *